C. A. LONG.
FERTILIZER SPREADER.
APPLICATION FILED JUNE 5, 1917.
1,260,219.
Patented Mar. 19, 1918.
2 SHEETS—SHEET 1.
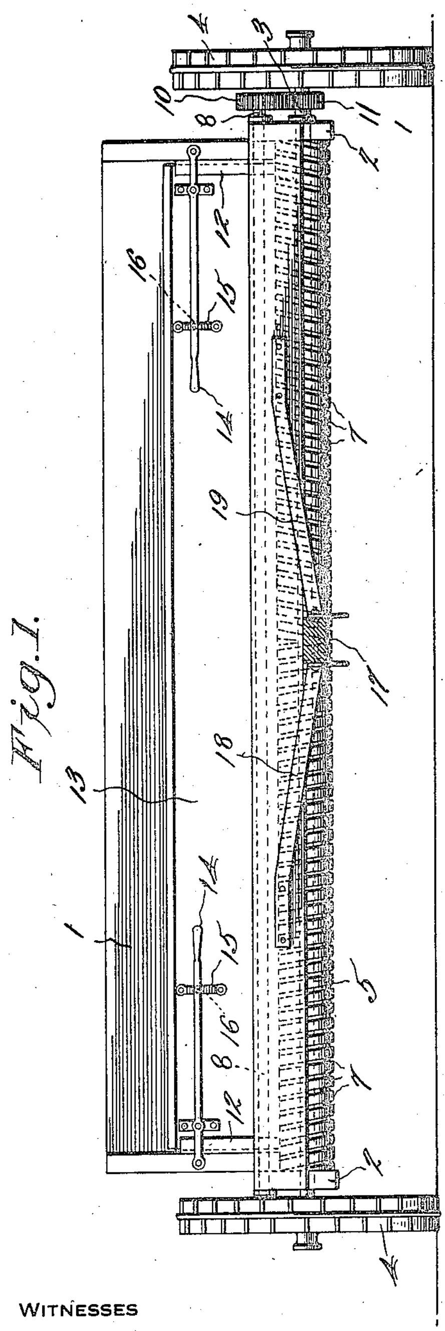
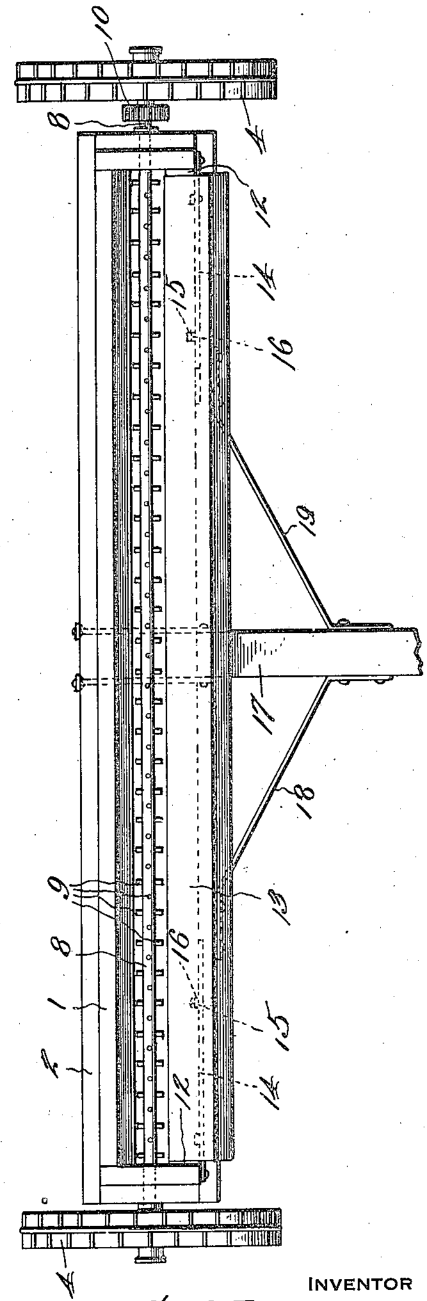
WITNESSES
INVENTOR
C. A. Long,
BY Victor J. Evans
ATTORNEY C. A. LONG.
FERTILIZER SPREADER.
APPLICATION FILED JUNE 5, 1917.
1,260,219.
Patented Mar. 19, 1918.
2 SHEETS—SHEET 2.
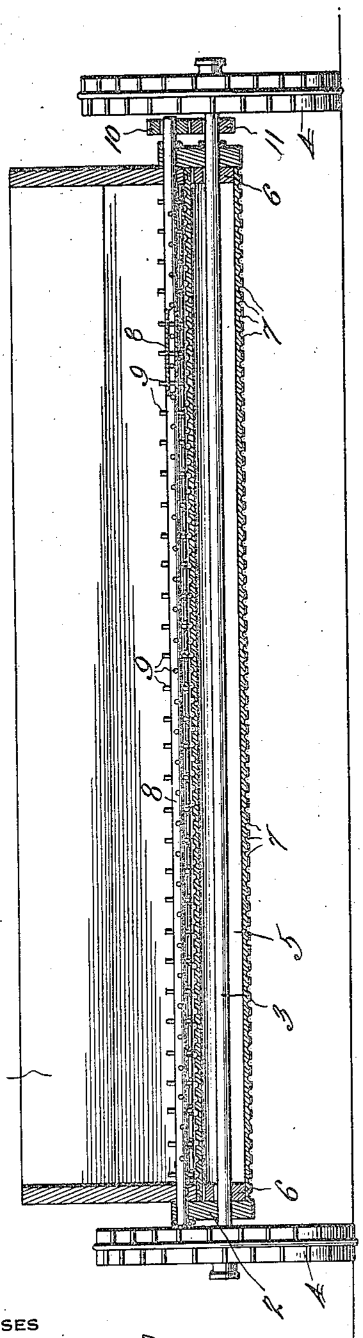
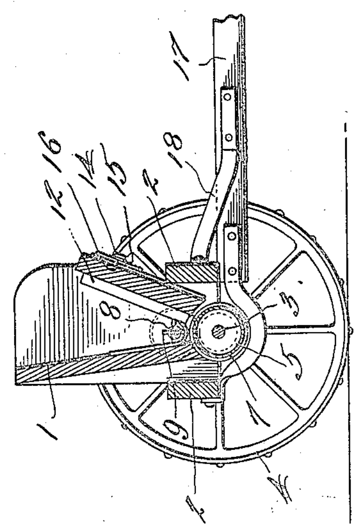
WITNESSES
W. Max. Duvall
L. C. Wilcox.
INVENTOR
C. A. Long,
BY Victor J. Evans
ATTORNEY

UNITED STATES PATENT OFFICE.

CORY A. LONG, OF MILFORD, ILLINOIS.

FERTILIZER-SPREADER.

1,260,219. Specification of Letters Patent. Patented Mar. 19, 1918.

Application filed June 5, 1917. Serial No. 172,949.

*To all whom it may concern:*

Be it known that I, CORY A. LONG, a citizen of the United States, residing at Milford, in the county of Iroquois and State of Illinois, have invented new and useful Improvements in Fertilizer-Spreaders, of which the following is a specification.

This invention relates to distributers especially adapted to be used for spreading crushed limestone or phosphate upon the surface of the soil and it consists in the novel features hereinafter described and claimed.

An object of the invention is to provide a distributer of the character stated which is of simple and durable structure and which may be used for efficiently spreading granular material for the purpose of fertilization.

With this object in view the distributer comprises a hopper which is supported upon an axle, the same in turn being supported upon ground wheels. A cylinder is mounted upon the intermediate portion of the axle and traverses the length of the hopper and is provided at its periphery with right and left hand grooves of spiral disposition. The said cylinder serves in part as a closer for the lower part of the hopper and an agitator is mounted in the hopper above the cylinder and is operatively connected with the axle. The hopper is provided at its forward portion with an adjustable panel and means for raising and lowering the same. The lower edge of the said panel is in proximity of the periphery of the cylinder and hence as the panel is raised or lowered the space between the lower edge thereof and the periphery of the cylinder may be increased or diminished thus regulating the flow of material from the hopper as the cylinder rotates with the axle.

In the accompanying drawing:—

Figure 1 is a front elevation of the distributer;

Fig. 2 is a top plan view of the same;

Fig. 3 is a longitudinal sectional view of the same;

Fig. 4 is a transverse sectional view of the same.

The distributer comprises a hopper 1 which is preferably formed from wood and which is supported upon a frame 2 mounted on an axle 3. Ground wheels 4 are journaled at the ends of the axle 3 and are provided at their hubs with escapement devices of usual pattern whereby the axle 3 is rotated when the wheels are turned in a forward direction but the axle may remain at rest when the wheels turn in a rearward direction and thus facilitate the turning of the machine. A cylinder 5 is supported upon the axle 3 by means of heads or cores 6 located at the ends of the cylinder and close the same. The ends of the cylinder 5 are journaled in the ends of the hopper 1 and the said cylinder in part forms a closer for the lower portion of the hopper. The cylinder 5 is provided upon its periphery with spiral grooves 7. These grooves are disposed in right and left hand relation with respect to each other and they meet at their inner ends approximately midway between the ends of the cylinder.

A shaft 8 is journaled in the hopper 1 above the cylinder 5 and is provided with a number of radially disposed pins 9. A gear wheel 10 is fixed to one end portion of the shaft 8 and meshes with a gear wheel 11 which is fixed upon the axle 3. Guides 12 are mounted at the forward edges of the end members of the hopper 1 and at the inner surfaces thereof and the said guides are downwardly and rearwardly inclined. A panel 13 is slidably mounted in the guides 12 and forms the forward side of the hopper 1. Levers 14 are fulcrumed at points between their ends to the panel 13 and the outer ends of the said levers 14 are pivoted to the end members of the hopper 1 and at the forward edges thereof as best shown in Fig. 1 of the drawing. Rack members 15 are mounted upon the forward surface of the panel 13 and the levers 14 are disposed transversely thereof. The said levers 14 are provided at their rear sides with lugs 16 which are adapted to engage the teeth of the members 15 whereby the levers 14 are held at adjusted positions. A tongue 17 extends forwardly from the frame 2 and the rear portion of the said tongue 17 is pivotally connected with the said frame by means of braces 18 and 19.

It is apparent that by swinging the levers 14 in a forward direction, the lugs 16 may disengage the teeth of the rack members 15 and hence the said levers 14 may be swung vertically whereby the panel 13 is moved with relation to the cylinder 5. When the lower edge of the said panel is at the desired distance from the periphery of the said cylinder the lugs 16 of the levers 14 are permitted to engage the teeth of the members 15 whereby the said parts are held at their adjusted positions.

As the machine is drawn over the surface of the soil in a forward direction the wheels 4 rotate the axle 3 which in turn carries the cylinder 5 around with the same. Inasmuch as the pulverized or crushed material has been placed in the hopper 1 the said material will enter the grooves 7 at the periphery of the cylinder 5 and hence the said material is carried under the lower edge of the panel 13 and is permitted to gravitate to the surface of the soil.

From the foregoing description taken in conjunction with the accompanying drawing, it will be seen that a distributer of simple and durable structure is provided and that the same may be economically used for efficiently distributing granular material at the surface of the soil for fertilization and other purposes.

Having described the invention what is claimed is:—

A distributer comprising a hopper, a cylinder journaled for rotation and serving as a bottom for the hopper, said cylinder having its end portions extending through the end walls of the hopper and its lower portion extending below the lower edges of the end walls of the hopper, said cylinder being provided upon its periphery with spiral grooves which extend the full length of the cylinder and hopper whereby the end portions of the grooves are disposed under the end walls of the hopper and below the lower edges thereof.

In testimony whereof I affix my signature.

CORY A. LONG.